(12) United States Patent
Kobre

(10) Patent No.: US 8,381,471 B2
(45) Date of Patent: Feb. 26, 2013

(54) PACKAGING/CONSTRUCTION MATERIAL TO MAKE VARIABLE SIZED STRUCTURES WITH INTRINSIC CUSHIONING

(76) Inventor: Stephen C. Kobre, Woodstock, MD (US)

( * ) Notice: Subject to any disclaimer, the term of this patent is extended or adjusted under 35 U.S.C. 154(b) by 1027 days.

(21) Appl. No.: 11/607,083

(22) Filed: Dec. 1, 2006

(65) Prior Publication Data

US 2007/0172634 A1 Jul. 26, 2007

Related U.S. Application Data

(60) Provisional application No. 60/748,591, filed on Dec. 9, 2005.

(51) Int. Cl.
*B65D 25/00* (2006.01)
*E04B 1/74* (2006.01)
(52) U.S. Cl. .................. 52/404.1; 206/523; 220/62.1
(58) Field of Classification Search ............. 52/404.1, 52/408, 409; 206/253, 523; D9/756; 53/450; 229/115, 116; 220/62, 62.1
See application file for complete search history.

(56) References Cited

U.S. PATENT DOCUMENTS

| | | | | |
|---|---|---|---|---|
| 2,908,383 A * | 10/1959 | Vogt | ............................. | 206/526 |
| 3,266,705 A * | 8/1966 | Wood | ............................. | 206/523 |
| 3,273,779 A * | 9/1966 | Mykleby | ...................... | 206/523 |
| 3,581,883 A * | 6/1971 | Whitney | ...................... | 206/591 |
| 3,598,303 A * | 8/1971 | Folz | ............................. | 229/101 |
| 3,757,481 A * | 9/1973 | Skinner | ........................... | 52/265 |
| 4,241,829 A * | 12/1980 | Hardy | .......................... | 206/709 |
| 4,495,237 A * | 1/1985 | Patterson | .................... | 428/178 |
| 4,799,590 A * | 1/1989 | Furman | ........................ | 206/390 |
| 4,861,642 A * | 8/1989 | Stagg et al. | ................... | 428/139 |
| 4,965,138 A * | 10/1990 | Gonzalez | ...................... | 428/593 |
| 5,160,473 A * | 11/1992 | Bontrager | ..................... | 264/138 |
| 5,492,749 A * | 2/1996 | Solves et al. | ................. | 428/172 |
| 5,612,117 A * | 3/1997 | Belanger et al. | ............. | 428/178 |
| 5,641,068 A * | 6/1997 | Warner | ........................ | 206/523 |
| 5,738,216 A * | 4/1998 | Warner | ........................ | 206/523 |
| 6,053,346 A * | 4/2000 | Niles et al. | ...................... | 220/62 |
| 6,119,929 A * | 9/2000 | Rose | ............................. | 229/101 |
| 6,713,008 B1 * | 3/2004 | Teeter | .......................... | 264/258 |
| 6,904,734 B2 * | 6/2005 | Hardy | ............................ | 53/399 |
| 7,010,897 B1 * | 3/2006 | Kuppers | ....................... | 52/793.1 |
| 7,070,089 B2 * | 7/2006 | Kim et al. | ..................... | 229/101 |
| 2007/0033891 A1 * | 2/2007 | Imbabi | .......................... | 52/387 |

OTHER PUBLICATIONS

Pyramid Foam, Mar. 8, 2002, Foam Factoryy, Inc., p. 1-5.*

* cited by examiner

*Primary Examiner* — Joshua J Michener
*Assistant Examiner* — Elizabeth A Plummer
(74) *Attorney, Agent, or Firm* — Nixon & Vanderhye, P.C.

(57) ABSTRACT

Material engineered with outer flat and inner cushioned layers for fabricating shipping and gift boxes of various sizes to handle items of diverse dimensions. Thin, strong sheet that will remember a right angle bend after scoring or hand-flexing, molded or bonded to inner surface grid of right-angle, equal-sized pyramid shapes covering the entire surface that will serve to cushion fragile items placed inside a variable sized box made from the subject material. The material will be available in different size sheets and pyramid sizes, depending the dimensions and weight of the items to be boxed. The right angle pyramids will allow easy scoring and bending of the material, and each right angle formed for the box under construction will have one right angle pyramid abut another, forming a larger right angle pyramid that along with the bend in the material sheet will afford great rigidity to the finished box.

4 Claims, 15 Drawing Sheets

PACKAGING/CONSTRUCTION MATERIAL TO MAKE VARIABLE SIZED STRUCTURES WITH INTRINSIC CUSHIONING

CROSS-REFERENCES TO RELATED APPLICATIONS

This application claims the benefit of Provisional Application No. 60/748,591, filed Dec. 9, 2005, the entire content of which is hereby incorporated by reference in this application.

TECHNICAL FIELD

This invention relates generally to packaging/construction methodology and apparatus and to a new material design that is a combination of an outer, smooth, semi-rigid surface to be folded into, for example, a variable sized box, and an inner, cushion layer that will protect box contents as well as add strength to the assemblage due to the material's internal structure.

BACKGROUND AND SUMMARY

A vast multitude of items have been sold via eBay auctions on a daily basis. Everything from toy soldiers, to chairs to Star Wars cookie jars to Barbie dolls to music boxes. These items tend to differ greatly in size and weight, and necessitate a panicked search on many occasions for not only a cardboard box of suitable size, but also packing/cushioning materials (bubble wrap, foam noodles, cardboard, shredded paper, etc.) that would safeguard box contents.

FIG. 1 shows a prior art cardboard box along with many of the available cushioning materials—frequently more costly than the cardboard box itself—that are utilized to pad a boxed object.

A vast segment of the shipping industry utilizes cardboard boxes, and the new material described herein is not meant to replace all of them. Whenever a manufacturer of DVD players, for example, needs to ship 50,000 identical units, it is known beforehand what the dimensions will be for a suitable shipping box, and there is economy in ordering huge numbers of boxes of identical size. It should be noted that in the industry segment that ships electronic components, that the custom foam or other internal structures frequently rival the cost of the box itself.

Alternatively, the unique material shown in the illustrative embodiment provide a viable alternative due to economy of scale that can be employed in its manufacture: It can be molded in one piece (bonding 2 pieces would be a viable alternative), in contrast to the larger number of packaging components found in the referenced example of a DVD player shipping box, which at a minimum would consist of the box and custom foam forms. Other components—even toys—commonly use not only foam but additional cardboard inner boxes and braces.

The illustrative embodiments described herein permit packaging, protecting, and quickly shipping dozens of variably sized items to various customers that were winners of my eBay auctions. The illustrative embodiments allow creation of self-cushioned, variable sized boxes that are believed to be an improvement for not only my own shipping needs, but for many other people's preparation of packages for gifts and various other items. FIG. 2 illustrates some of the diverse items that have been laboriously packaged and shipped as part of eBay auction activities.

The illustrative embodiments offer a dramatic improvement in the way internet merchants and many other purveyors of variable size and weight items can conveniently package and simultaneously protect even fragile items, and also may indeed offer a viable alternative to industries that ship many identical items.

The illustrative embodiments described herein may comprise a material with outer flat and inner cushioned layers for fabricating shipping and gift boxes of various sizes, to handle items of diverse dimensions and weights. The material may be of variable density foam or a bonded material that, for example, includes: A flat outer surface—thin, strong sheet that will remember a right angle bend after scoring or hand-flexing; and molded or bonded to the sheet's inner surface, a grid of right-angle pyramid shapes that will consist of plastic closed cell, other foam or alternative material soft enough to cushion fragile items placed inside a variable sized box made from the subject material. The base of each pyramidal form may be the same dimensions for a given piece or run of the material, but the material may be available in different size sheets and pyramid sizes, depending the dimensions and weight of the items to be boxed. Because in this implementation all of the pyramidal shapes are right angle pyramids at their peaks, the larger their base dimensions, the taller the pyramid. Hence, thicker cushioning will be provided for larger, heavier, or more fragile items by pyramids with larger bases. The right angle pyramids will allow easy scoring and bending of the material, and each right angle formed for the box under construction will have one right angle pyramid abut another, forming a larger right angle pyramid that along with the bend in the material sheet will afford great rigidity to the finished box. Excess material will be easily scored and trimmed away for future use or utilized as additional box padding, especially if multiple items are packed in one box. Transparent, strong tapes either provided with a "kit" including the subject material sheet, or a generally available packaging tape, will be used to seal the outer, flat box surfaces in the same way that a conventional cardboard box is sealed.

BRIEF DESCRIPTION OF THE DRAWINGS

Reference is made in the various sections of the Description to the following briefly identified drawings (FIGS. 1-17), wherein like referenced numerals in the document pertain to corresponding elements on a particular Figure.

DETAILED DESCRIPTION OF THE ILLUSTRATIVE EMBODIMENTS

The illustrative embodiments herein described comprise a new material with outer flat and inner cushioned layers for fabricating shipping and gift boxes of various sizes to handle items of diverse dimensions.

Figure 1:
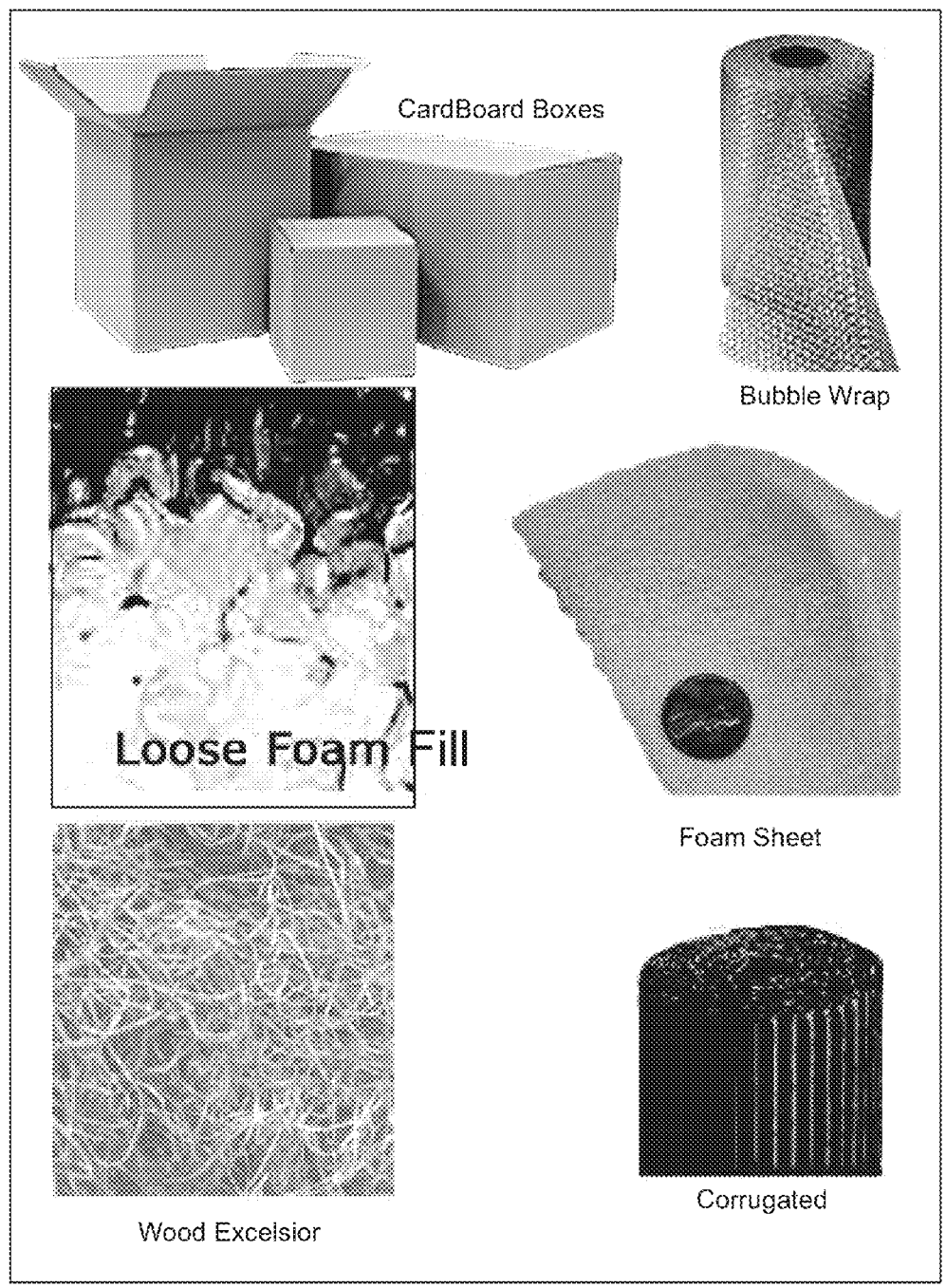
FIG. 1 illustrates prior art cardboard boxes and various conventional cushioning materials typically used to protect items within a box.
Figure 2:
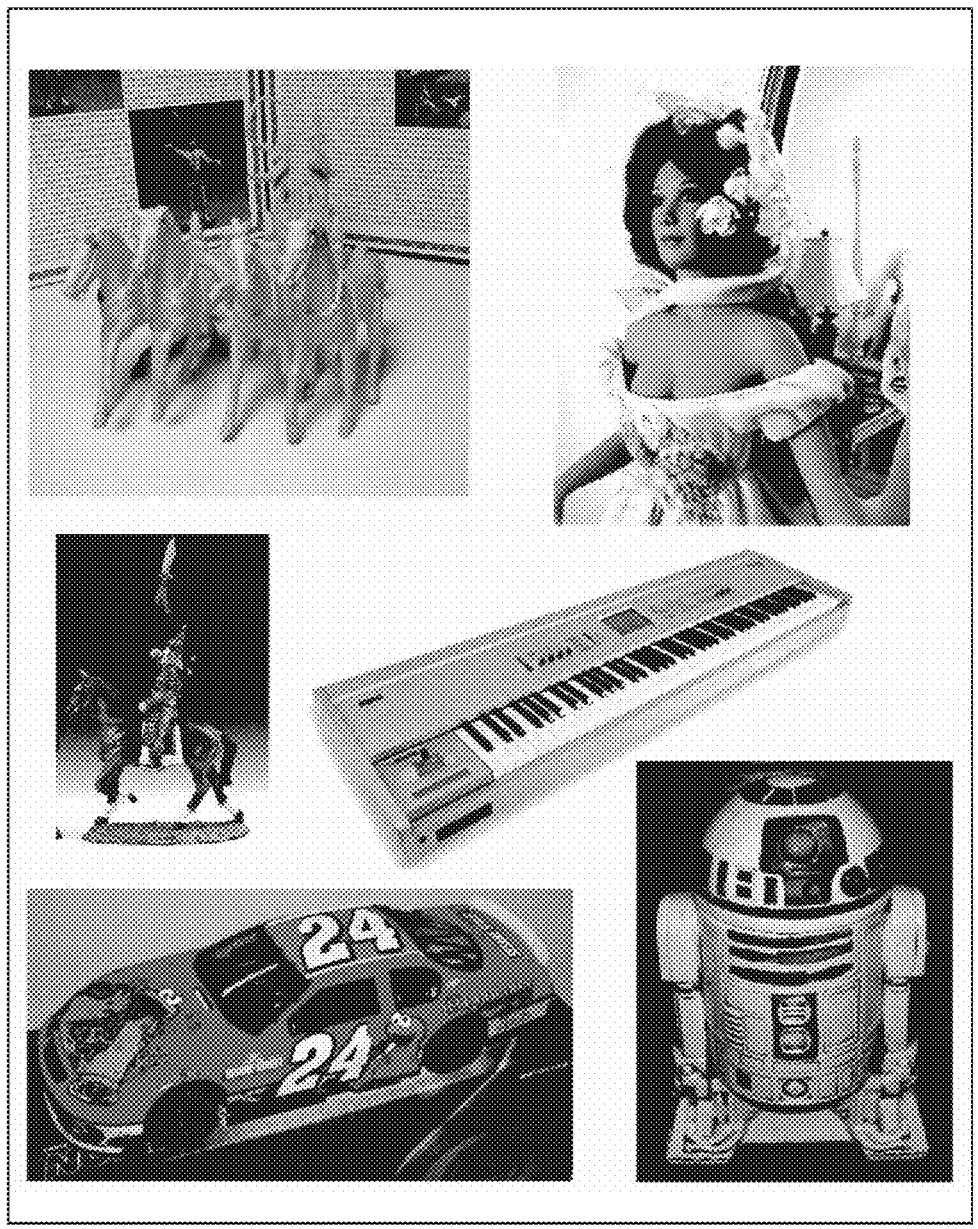
FIG. 2 illustrates items of diverse size and weight that the inventor has had to package and ship to meet his sales obligations.
Figure 3A:
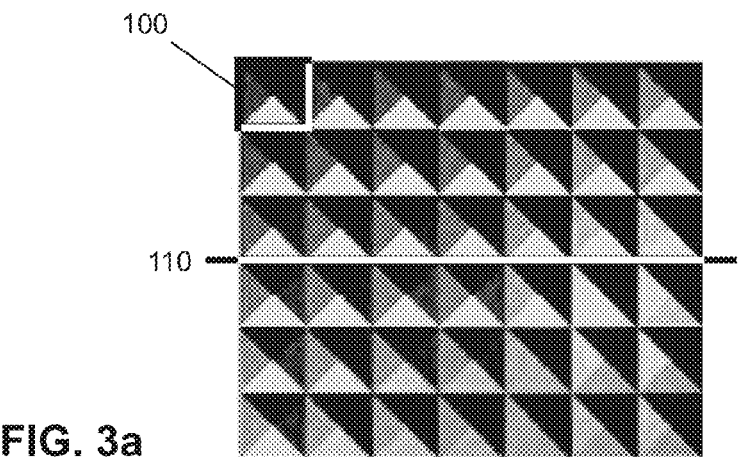
FIG. 3a illustrates a top view of the interior surface of the subject material, the pyramidal grid structure, showing the overall pyramidal architecture in rows and columns, as well as an individual pyramidal structure 100.

FIG. 3a illustrates a top view of the interior surface of the subject material, the pyramidal grid structure, showing the overall pyramidal architecture in rows and columns, as well as an individual pyramidal structure 100 and the valley 110 running between rows and columns of pyramidal structures; this lowest point on the interior surface being the backside of the exterior, flat surface. This valley is where all selective folding and trimming of the material will take place to construct variably configured box-like and/or wall-like structures.

Figure 3B:
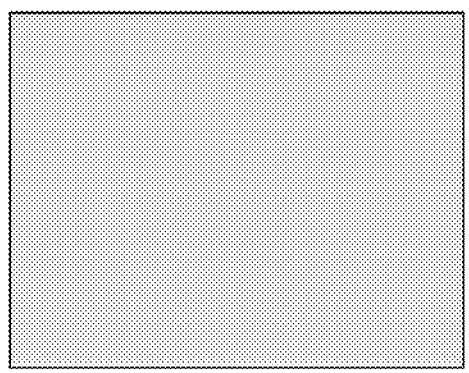
FIG. 3b illustrates a top view of the exterior flat surface of the subject material.
Figure 3C:
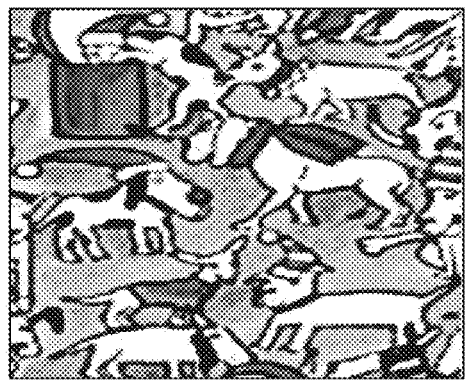
FIG. 3c illustrates a top view of the exterior surface, with gift-oriented printed decoration as part of the manufacturing process.

FIG. 3b illustrates a top view of the exterior flat surface of the subject material. FIG. 3c illustrates a top view of the exterior surface, with gift-oriented printed decoration as part of the manufacturing process. An additional feature of the outer, smooth material surface would come into play when using the material to make gift boxes: Seasonal decorative patterns could be printed during the manufacturing process to preclude the gift wrapping in many cases (FIG. 3c).

The material may, for example, be made of a variable density foam or a bonded material that includes: A flat outer surface—thin, strong sheet that will remember a right angle bend (FIG. 14) after scoring or hand-flexing; and molded or bonded to the sheet's inner surface, a grid of right-angle pyramid shapes (FIG. 5) that will consist of plastic closed cell, other foam or alternative material soft enough to cushion fragile items placed inside a variable sized box made from the subject material. The bases of the pyramidal forms will have the same dimensions (FIG. 4) for a given piece or run of the material.

In accordance with an exemplary embodiment, a package may have pyramid bases measuring 3 inches on a side, giving an internal cushioning height (distance from the base to the peak of each pyramid) of 1.5 inches. However, the material lends itself to scaling up or down in size, and would be available in different size sheets and pyramid sizes to suit dimensions and weight of the items to be boxed.

This material, however, is not only pertinent for construction of boxes: Scaled up in size so that pyramid base sizes would start at approximately 1 foot, this material would be useful for constructing walls for both conventional buildings and lightweight structures such as habitable, large box constructs and walls.

Figure 17:
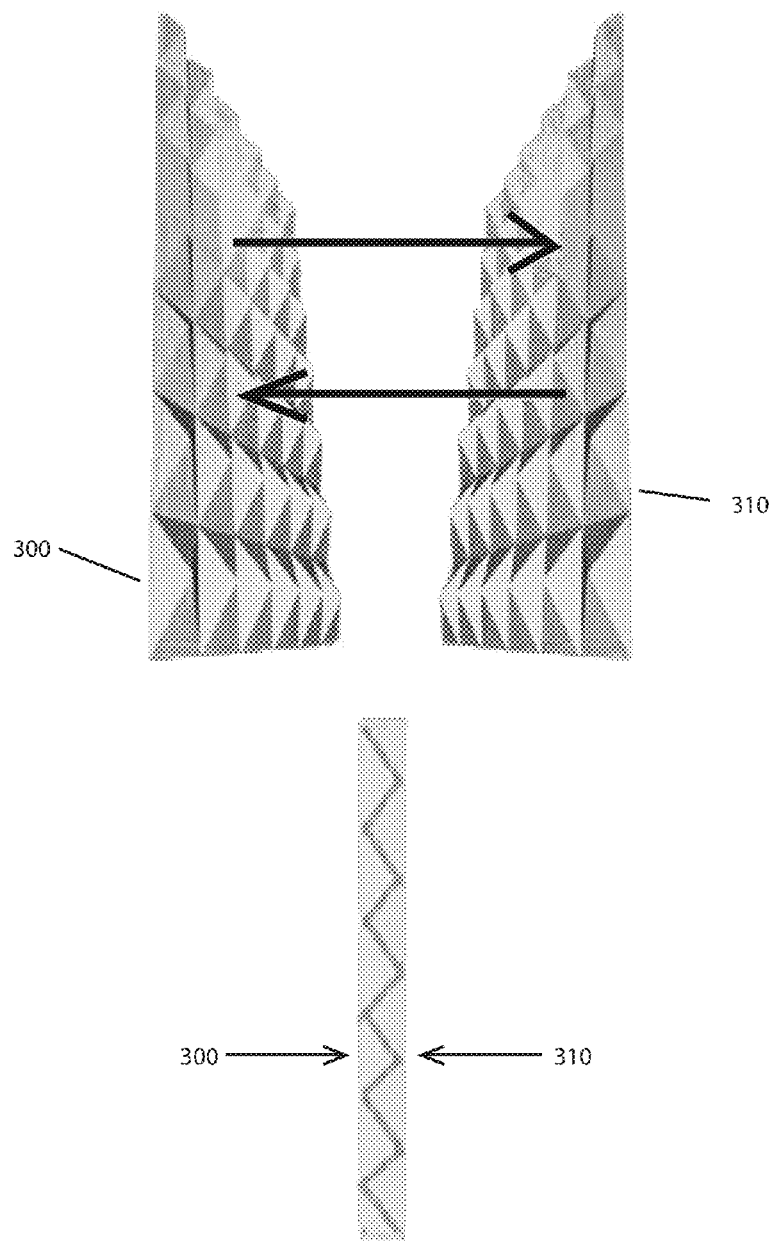
FIG. 17 shows a wall "sandwich" structure made from 2 opposing sheets of the material.

Wall structures could also be fashioned from 2 opposing sheets of the material (FIG. 17), with the inner pyramidal structures of 1 sheet meshing with those of a second sheet. FIG. 17 shows a wall "sandwich" structure made from 2 opposing sheets of the material, with the inner pyramidal structures 300 of one sheet meshing with the pyramidal structures 310 of a second sheet. This meshing of cushioning or insulating foam produces a solid layer of insulation between the two outer surfaces of a wall-like structure. In one futuristic, illustrative implementation, these types of structures would also be suitable for space-based station modules, or, looking not-so-far ahead, space-colony habitats. A possible means of constructing a space station module may be to employ program-controlled electromechanical extensors and program-triggered adhesives located in the pyramidal structures, which would be designed to complete "box-like" or more complex structures with right-angled additions, with minimal human interaction.

Scaled down in size, so that pyramid base sizes' would start at approximately 1 inch or less; this material would be very useful and fun to manipulate in forming walls for construction toys and architectural planning kits.

FIGS. 4 through 7 show what may look like a "fly-by" of the inner structure of the material. These figures depict the geometric simplicity of the illustrative implementation. Triangular shapes by their nature are one of the strongest architectural forms, and the right angle pyramids used on this material greatly add to the strength of the completed box assemblage, whatever box dimensions are chosen.

Figure 16:
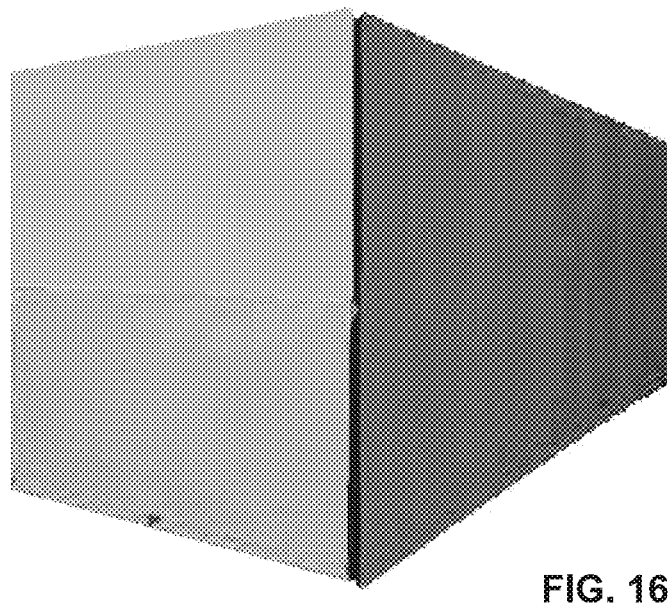
FIG. 16 illustrates a perspective view of the box that was completed after placing an item inside that dictated the dimensions to which the box was constructed.

Because the pyramidal shapes are right angle pyramids at their peaks, the larger their base dimensions, the taller the pyramid. Hence, thicker cushioning will be provided for larger, heavier, or more fragile items by pyramids with larger bases. The right angle pyramids will allow easy scoring and bending of the material, and each right angle formed for the box under construction will have one right angle pyramid abut another, forming a larger right angle pyramid with its peak situated in the corner formed by the abutting pyramidal structures, that along with the bend in the material sheet will afford great rigidity to the finished box (FIG. 16). Excess material will be easily scored and trimmed away for future use or utilized as additional box padding, especially if multiple items are packed in one box.

When fashioning a box from this material, the user need only place the object to be boxed on the inside of a sheet of material to be able to visually decide on the fold lines and what parts of the sheet are not needed for a given application. None of the material would go to waste, since it could be utilized for smaller boxes, or as previously stated, to divide or cushion the box interior in the event that more than one item is to be packed within.

To complete box construction, transparent, strong tapes either provided with a "kit" including the subject material sheet or a generally available packaging tape will be used to seal the outer, flat box surfaces (FIG. 14) in the same way that a conventional cardboard box is sealed. For even stronger boxes, glue can be strategically applied to the sides of abutting pyramidal forms to give the finished box a strong "skeleton" that conceivably would be stronger than a like-sized conventional cardboard box application. Since the new packaging material can be made from a number of prospective base materials, selecting the appropriate materials for a given box dimension/weight will be an important consideration in material production.

Figure 10A:
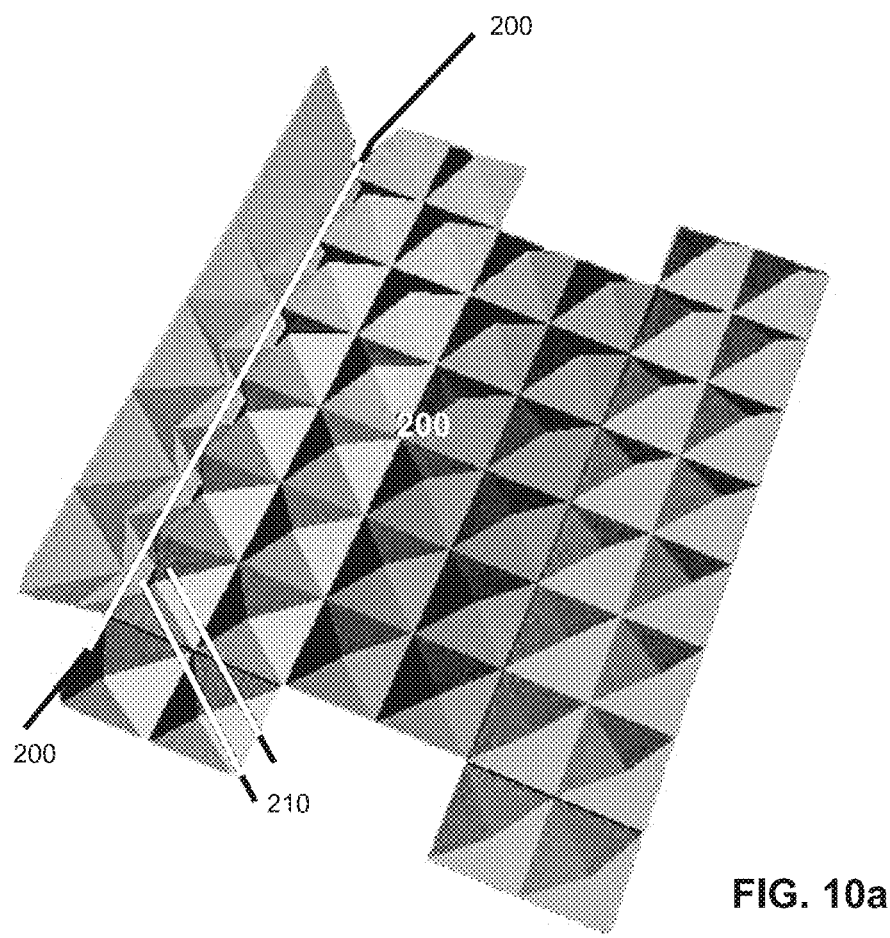
FIG. 10a illustrates a perspective view of a box being formed.
Figure 13:
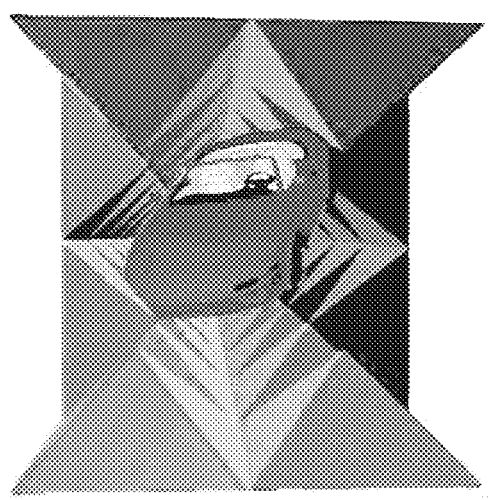
FIG. 13 illustrates a perspective view of the box after three folds have been made.

The illustrative embodiments incorporate a new material design that is a combination of an outer, smooth, semi-rigid surface (FIG. 3b) to be folded into a variable sized box, with an inner, cushion layer (FIG. 3a) that will not only protect box contents, but will also add strength to the box assemblage. This latter feature is due to the structural grids of equal-sized right-angle pyramids completely lining the box (FIG. 10a). These pyramids will abut each other at right angle that the box sides will naturally form with each other (FIG. 13).

Figure 4:
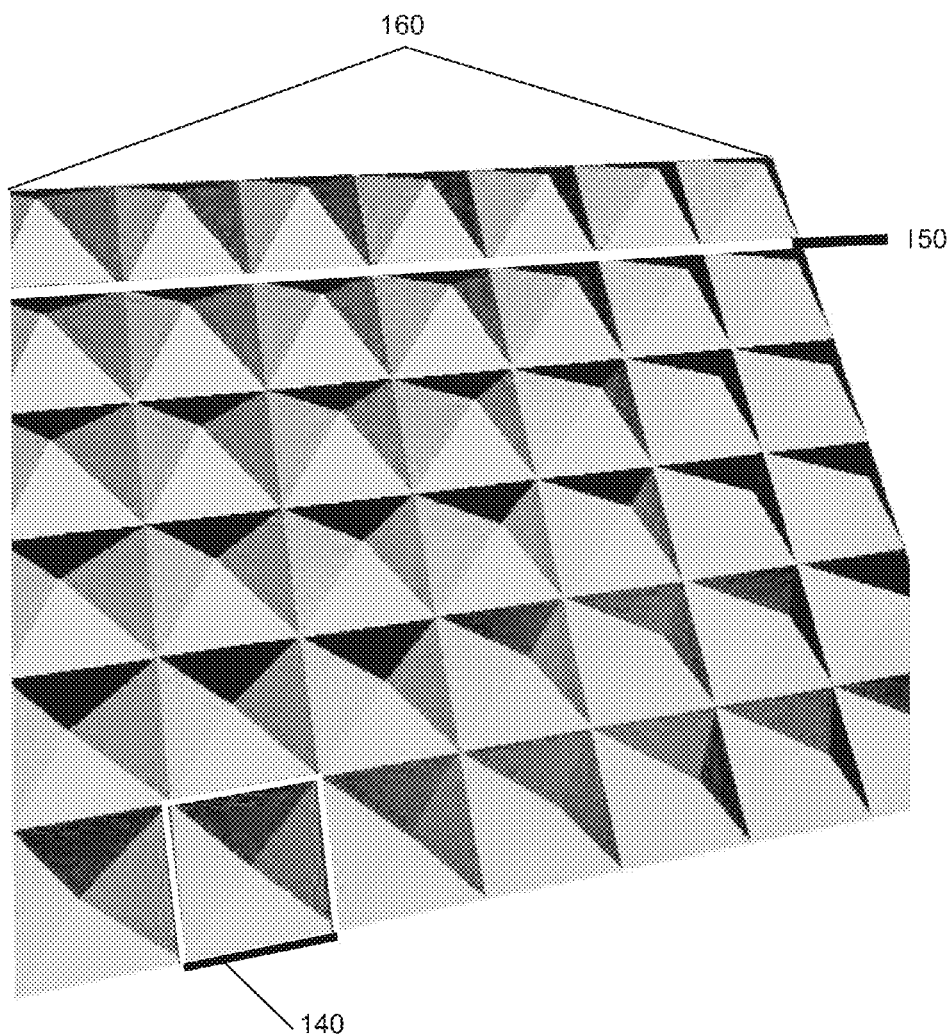
FIG. 4 illustrates a slight perspective view of the interior surface.

FIG. 4 illustrates a slight perspective view of the interior surface, to begin to show the nature of the pyramidal structure grid. An individual pyramidal structure 150 is shown along with an entire sheet 160 of pyramidal rows and columns, as well as the fold/trim valley 140 between rows/columns of pyramidal structures.

Figure 5:
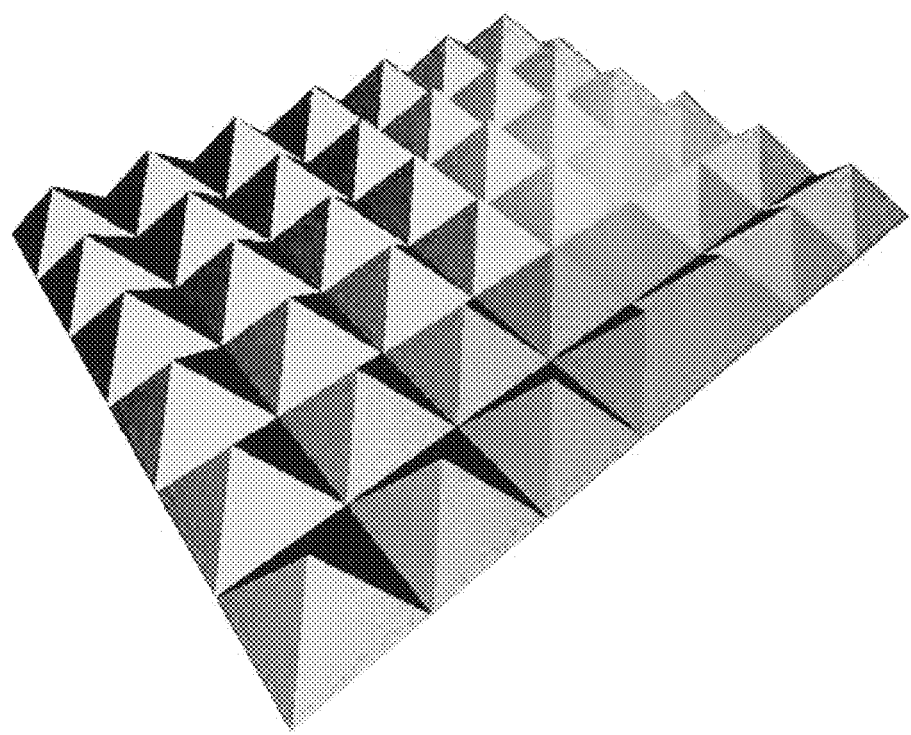
FIG. 5 illustrates slightly more perspective and zooms in on the pyramidal structure grid to impart greater understanding of this architectural feature of the subject material.

FIG. 5 illustrates slightly more perspective and zooms in on the pyramidal structure grid to impart greater understanding of this architectural feature of the subject material.

Figure 6:
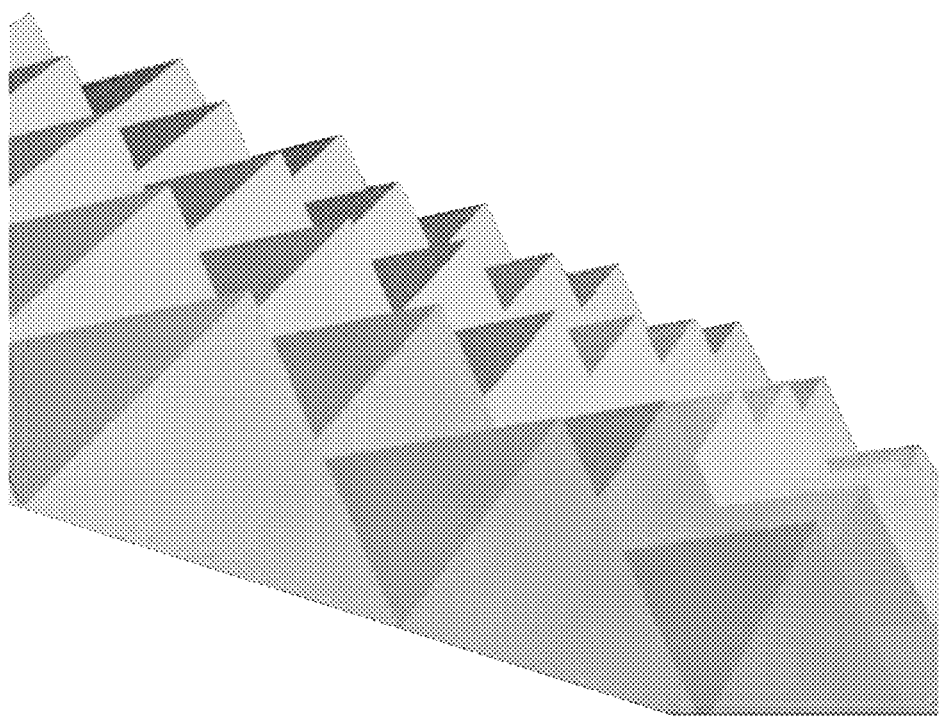
FIG. 6 zooms in closer to the pyramidal structure grid to show its simple, geometric nature.

FIG. 6 zooms in closer to the pyramidal structure grid to show its simple, geometric nature.

Figure 7:
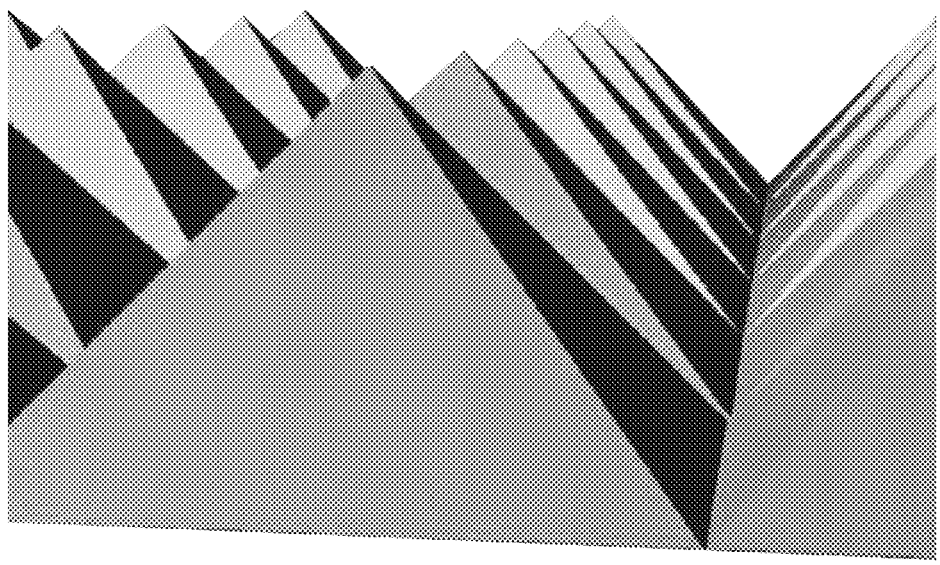
FIG. 7 zooms in even closer to the pyramidal structure grid, a worms-eye view illustrating the simple use of geometry made by the subject material.

FIG. 7 zooms in even closer to the pyramidal structure grid, a worms-eye view illustrating the simple use of geometry made by the subject material.

FIGS. 8-16 illustrate the actual construction of a shipping box from the subject material, showing step-by-step, with a number of close-ups to give added clarity, the trimming, folding, and shaping of what looks like a normal box on the outside, with its internal cushioning feature protecting even fragile items from the dangers of shipping—known only too well by this inventor.

Figure 8:
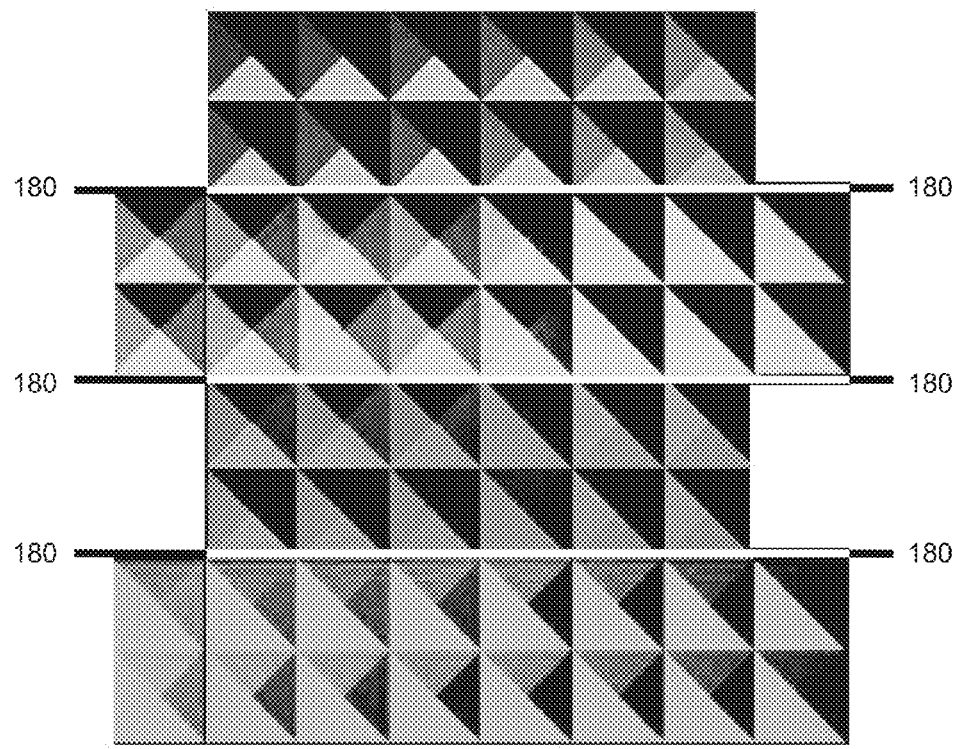
FIG. 8 illustrates the top view of the interior surface of a piece of the subject material that has been trimmed and is ready to score and fold into a variable sized box.

FIG. 8 illustrates the top view of the interior surface of a piece of the subject material that has been trimmed and is ready to score and fold into a variable sized box. The 4 different colors were used only to clarify where folds 180 will be made to produce the target box from what in the figure is 1 sheet of the material, as yet unfashioned into any final form.

Figure 9:
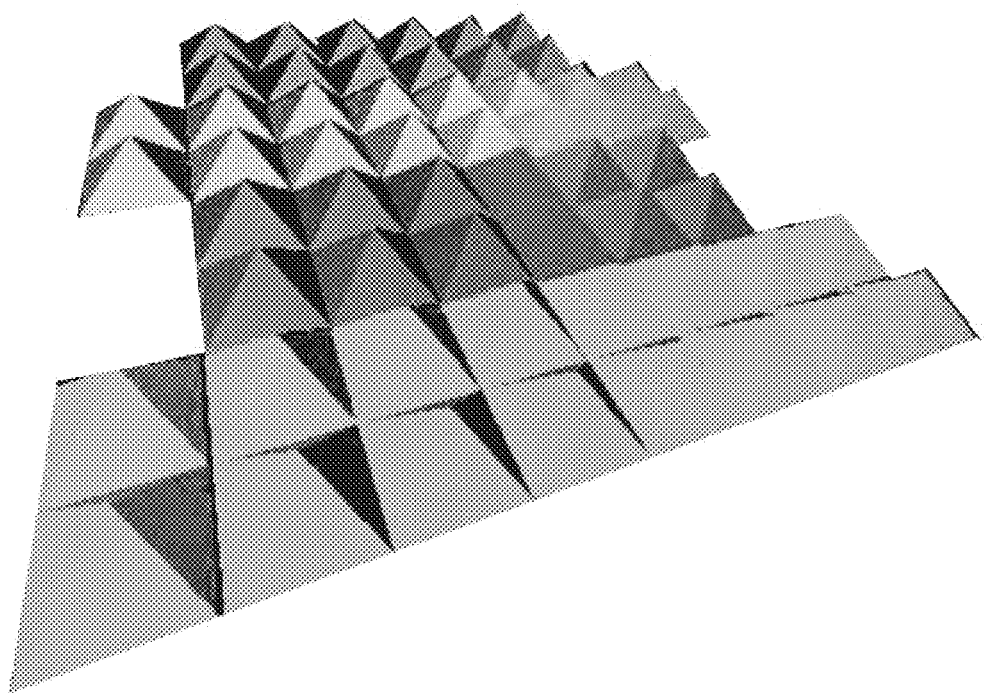
FIG. 9 illustrates a perspective view of the interior surface of the subject material referenced by FIG. 8.

FIG. 9 illustrates a perspective view of the interior surface of the subject material referenced by FIG. 8.

FIG. 10a illustrates a perspective view of a box being formed; one material surface has been folded at a right angle along a valley line 200 to begin the process to construct a 6-sided box from the subject material. When folded at a right angle, one or more pyramidal structures 210 from each of the folded planes will come into contact, offering additional structural strength to the box-like structure being developed.

Figure 10B:
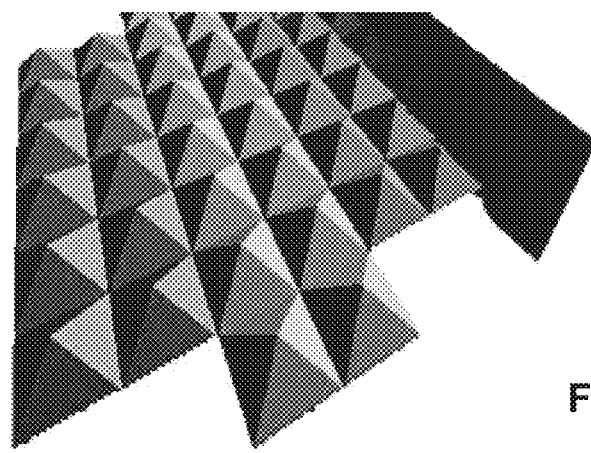
FIG. 10b is a smaller version of FIG. 10a, combined with succeeding views of the box under construction so that progress of several steps can be glimpsed on the same page.

FIG. 10b is a smaller version of FIG. 10a, combined with succeeding views of the box under construction so that progress of several steps can be glimpsed on the same page.

Figure 11A:
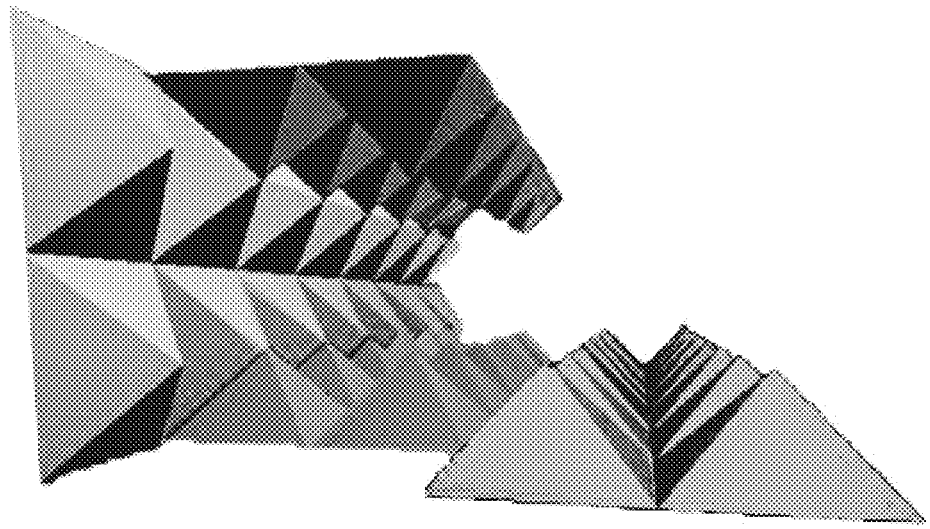
FIG. 11a illustrates a perspective view of the next step in formation of a box: Another surface has been folded; a box is taking shape complete with intrinsic cushioning.

FIG. 11a illustrates a perspective view of the next step in formation of a box: Another surface has been folded; a box is taking shape complete with intrinsic cushioning.

Figure 11B:
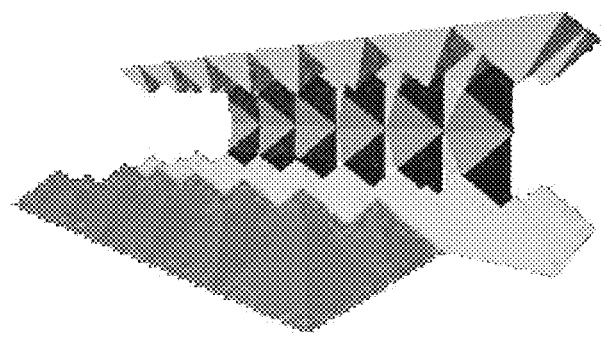
FIG. 11b is a smaller version of FIG. 11a, combined with progressive views of the box under construction so that several steps can be glimpsed on the same page.

FIG. 11b is a smaller version of FIG. 11a, combined with progressive views of the box under construction so that several steps can be glimpsed on the same page.

Figure 12:
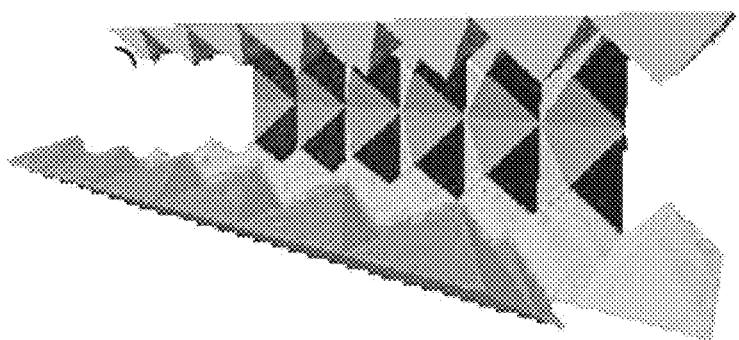
FIG. 12 illustrates a third perspective view of the box under construction: Two box surfaces have been folded at their final right-angle aspects, and a third box surface is shown in the process of being folded.

FIG. 12 illustrates a third perspective view of the box under construction: Two box surfaces have been folded at their final right-angle aspects, and a third box surface is shown in the process of being folded.

FIG. 13 illustrates a perspective view of the box after three folds have been made, definitely showing the box-like structure before the end 'flaps' are folded and secured. At this stage, conventional packaging tapes are used to seal the completed portions of the box. For an even stronger box, glue can be applied to abutting surfaces of the internal pyramidal structures, giving the finished box what amounts to an internal as well as external "skeleton".

Figure 14:
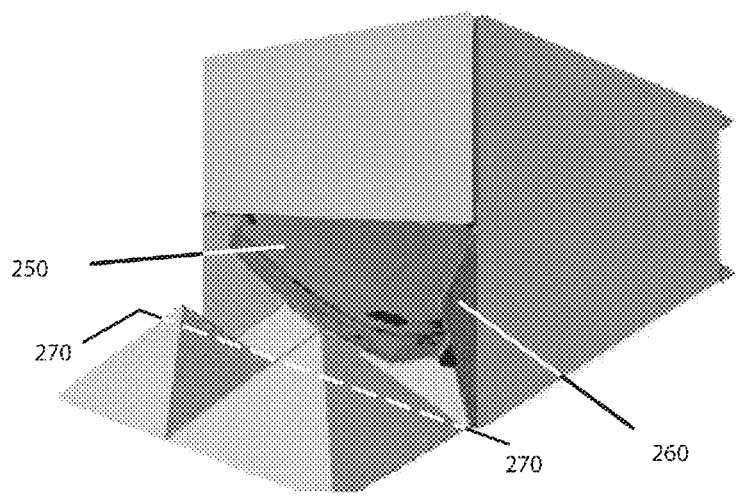
FIG. 14 illustrates a perspective view of the box after one end flap has been folded.

FIG. 14 illustrates a perspective view of the box after one end flap has been folded. The exterior flat box surfaces are clearly shown. One can see that from an exterior view the constructed box looks very much like a conventional box, masking the fact that the internal, intrinsic pyramidal grid structures are a new development in packaging. The toy car 250 is nestled between the inner, projecting pyramidal structures 260, and the remaining fold, along the valley 270 between pyramidal structures, will next be made, as shown in the next figure.

Figure 15:
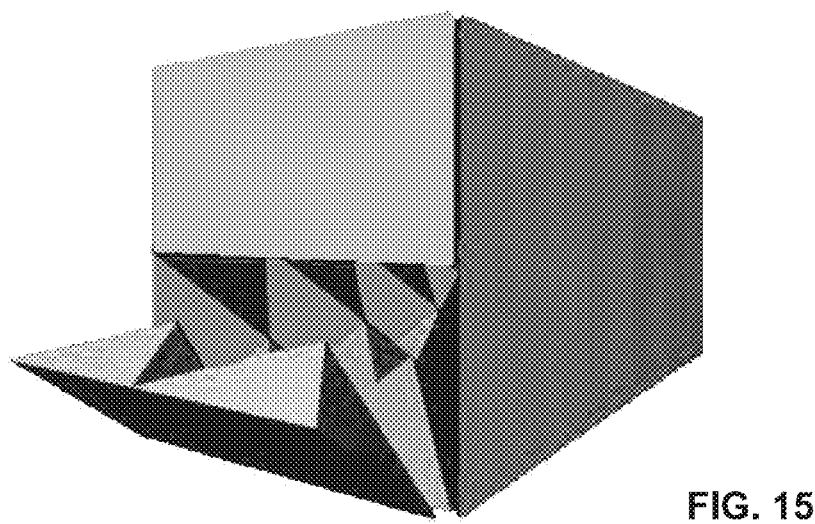
FIG. 15 illustrates a perspective view of the box after the second end flap is half-folded.

FIG. 15 illustrates a perspective view of the box after the second end flap is half-folded. The purpose here was to show the entire process of constructing a box with the subject material without being imprecise.

FIG. 16 illustrates a perspective view of the box that was completed after placing an item inside that dictated the dimensions to which the box was constructed. After sealing with tape, the box is now ready to ship.

The particular descriptions provided are illustrative examples, and features and advantages of each example may be interchanged with, or added to the features and advantages in the other embodiments and examples herein. And, in general, although the present invention has been described in detail, it should be understood that various changes, alterations, substitutions, additions and modifications can be made without departing from the intended scope of the invention, as defined in the Claims section.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended cs.

I claim:

1. A packaging box adapted to be formed with a size selected from different varying sizes comprising:
   a single piece of material having an outer surface including
      a plurality of box walls and a plurality of box edges defined by intersecting box walls, and an inner surface of cushioning material including
      a first linear array of pyramid structures such that each pyramid in the linear array has a 45 degree base and a 90 degree peak angle and shares one edge with a respective adjacent pyramid of the first linear array of pyramid structures;
      a second linear array of pyramid structures such that each pyramid in the linear array has a 45 degree base and a 90 degree peak angle and shares one edge with a respective adjacent pyramid of the second linear array of pyramid structures;

a plurality of additional linear arrays of pyramid structures such that each pyramid in the plurality of linear arrays has a 45 degree base and a 90 degree peak angle and shares one edge with a respective adjacent pyramid of the plurality of additional linear arrays of pyramid structures;

a first linear interface between the first linear array and said second linear array;

a plurality of additional linear interfaces between said plurality of additional linear arrays;

said plurality of box walls including a first score line along the first linear interface and a second score line along any of said plurality of additional linear interfaces, wherein each of the plurality of box edges is defined by one of the first linear interface and plurality of additional linear interfaces, wherein the location of the first and second score lines being selected based upon the desired size of the packaging box thereby permitting the size of said packaging box to be varied by the selection of linear interfaces serving as box edges;

wherein when the packaging box is assembled, the packaging box has a plurality of inside corners, and each inside corner of the plurality of corners is formed by mating a surface of one pyramid structure of the first linear array, the second linear array or the plurality of additional linear arrays with a respective abutting surface of one of a respective pyramid structure of the first linear array, the second linear array or the plurality of additional linear arrays such that the peak of the one pyramid structure and the peak of the respective pyramid structure are aligned to form a peak of a larger linear array of pyramid structures, wherein the peak of the larger linear array is situated at an inside corner.

2. A packaging box according to claim 1, wherein said one edge shared by each pyramid in said first linear array and said one edge shared by each pyramid in said second linear array are collinearly aligned.

3. A packaging box according to claim 2, wherein said one edge shared by each pyramid in said first linear array and said second linear array that are collinearly aligned form a score line that is perpendicular to said first score line.

4. A method for forming a packaging box from a single piece of material, wherein the size of the packaging box may be selected from different varying sizes, the packaging box having a plurality of box walls and a plurality of box edges, the method comprising the steps of:

providing the single piece of material as an outer sheet having a flat outer surface and an inner surface of cushioning material, said inner surface including a first linear array of pyramid structures such that each pyramid in the linear array has a 45 degree base and a 90 degree peak angle and shares one edge with a respective adjacent pyramid of the first linear array of pyramid structures;

a second linear array of pyramid structures such that each pyramid in the linear array has a 45 degree base and a 90 degree peak angle and shares one edge with a respective adjacent pyramid of the second linear array of pyramid structures;

a plurality of additional linear arrays of pyramid structures such that each pyramid in the plurality of linear arrays has a 45 degree base and a 90 degree peak angle and shares one edge with a respective adjacent pyramid of the plurality of additional linear arrays of pyramid structures;

a first linear interface between the first linear array and said second linear array;

a plurality of additional linear interfaces between said plurality of additional linear arrays;

forming said plurality of box walls by scoring a first score line along the first linear interface and a second score line along any of said plurality of additional linear interfaces, wherein each of the plurality of box edges is defined by one of the first linear interface and plurality of additional linear interfaces, wherein the location of the first and second score lines being selected based upon the desired size of the packaging box thereby permitting the size of said packaging box to be varied by the selection of linear interfaces serving as box edges;

creasing the single piece of material along the first and second score line at the lowest points between the first array pyramid structures, the second array pyramid structures and the plurality of pyramid structures; and wherein when the packaging box is assembled, the packaging box has a plurality of inside corners, and each inside corner of the plurality of corners is formed by mating a surface of one pyramid structure of the first linear array, the second linear array or the plurality of additional linear arrays with a respective abutting surface of one of a respective pyramid structure of the first linear array, the second linear array or the plurality of additional linear arrays such that the peak of the one pyramid structure and the peak of the respective pyramid structure are aligned to form a peak of a larger linear array of pyramid structures, wherein the peak of the larger linear array is situated at an inside corner.

* * * * *